United States Patent [19]

Snell

[11] Patent Number: 4,608,641

[45] Date of Patent: Aug. 26, 1986

[54] NAVIGATIONAL AID

[75] Inventor: Reginald J. Snell, Warton, England

[73] Assignee: British Aerospace Public Limited Company, London, England

[21] Appl. No.: 404,901

[22] Filed: Aug. 3, 1982

[30] Foreign Application Priority Data

Aug. 7, 1981 [GB] United Kingdom ............... 8124243
Feb. 5, 1982 [GB] United Kingdom ............... 8203334

[51] Int. Cl.$^4$ .............................................. G05D 1/10
[52] U.S. Cl. ................................... 364/434; 364/454; 364/453; 364/559; 73/178 R; 73/505
[58] Field of Search ............... 364/433, 453, 447, 449, 364/565, 566, 434; 73/502–507, 178 R; 318/584–586; 244/177, 191, 165, 167, 171; 340/967, 974

[56] References Cited

U.S. PATENT DOCUMENTS

| | | | |
|---|---|---|---|
| 3,545,266 | 12/1970 | Wilson | 73/151 |
| 3,699,316 | 10/1972 | Lopes, Jr. | 364/453 |
| 3,911,255 | 10/1975 | Dewar et al. | 364/453 |
| 3,916,697 | 11/1975 | Ludlum | 73/504 |
| 3,967,799 | 7/1976 | Muller | 364/453 |
| 4,038,527 | 7/1977 | Brodie et al. | 364/453 |
| 4,070,674 | 1/1978 | Buell et al. | 364/453 |
| 4,095,271 | 6/1978 | Muller | 364/453 |
| 4,173,784 | 11/1979 | Heath et al. | 364/453 |
| 4,212,443 | 7/1980 | Duncan et al. | 364/453 |
| 4,262,861 | 4/1981 | Goldstein | 364/453 |
| 4,343,035 | 8/1982 | Tanner | 364/453 |

OTHER PUBLICATIONS

E. J. Kroman, Sensor Mounted Inertial Measurement System, Jun. '73, 61–62, vol. 16, #1, *IBM-Technical Disclosure Bulletin*.

Primary Examiner—Errol A. Krass
Assistant Examiner—Thomas G. Black
Attorney, Agent, or Firm—Cushman, Darby & Cushman

[57] ABSTRACT

An aircraft operating in a gravitational field and having conventional sensors for measuring true air speed (sensors 10, 11), angles of incidence and yaw (sensors 13, 12), rotation about x, y and z axes and acceleration therealong (sensors 14, 15, 16) is provided with means for calculating the inertial component of the acceleration from data concerning the true air speed, heading and rotation of the aircraft obtained from the sensors, and means for comparing the inertial component with the total acceleration sensed, thereby to deduce the orientation of the gravitational component and hence obtain an estimate of the pitch and bank angles of the aircraft.

11 Claims, 2 Drawing Figures

β—Yaw angle referred to centre of gravity of aircraft.
$\dot{\beta}$—Rate of change of Yaw.
x, y, z—Aircraft body axes, right-hand set, centred on centre of gravity of aircraft; x forward along Horizontal Fuselage Datum, z positive downwards, (see Figures).
p, q, r—Rotations about x, y, z respectively, conforming to right-hand rule.
$\ddot{x}_i$, $\ddot{y}_i$, $\ddot{z}_i$—Inertial accelerations along x, y, z.
$\ddot{x}_m$, $\ddot{y}_m$, $\ddot{z}_m$—Measured accelerations along x, y, z, referred to centre of gravity of aircraft.
θ—Pitch angle
φ—Bank angle.
g—Acceleration due to gravity.

DETAILED DESCRIPTION OF THE PREFERRED EMBODIMENT

Referring to the Figures, there is shown an aircraft provided with a pitot/static pressure probe 10, an air temperature probe 11 and airstream direction detector probes 12 and 13 respectively for determining the local yaw and incidence angles of the aircraft, all mounted in a conventional manner at or near the nose cone of the aircraft. Accelerometer/rate gyro packages 14, 15 and 16 respectively are mounted in a conventional manner on the aircraft spaced from the centre of gravity 17 of the aircraft and aligned along the x-, y-, and z axes of the aircraft respectively. Each package comprises an accelerometers adapted to measure the acceleration along a said aligned axis and a rate gyro to measure the rotation about that axis.

In use, data from the pitot/static pressure probe 10 and the air temperature probe 11 are combined to compute the true air speed V of the aircraft, in a conventional manner. Data concerning the local yaw and incidence angles collected from probes 12 and 13 is combined with data concerning the rotation of the aircraft with respect to its centre of gravity gathered from accelerometer/rate gyro packages 14, 15 and 16 to compute values of incidence angle (α) and yaw angle (β) referred to the centre of gravity of the aircraft. Having thus computed values for V, α and β these values are smoothed and also derived to give values of $\dot{V}$, $\dot{\alpha}$ and $\dot{\beta}$.

The rotations about, and accelerations along, axes x, y and z measured by the accelerometer/rate gyro packages 14, 15 and 16 are corrected to allow for the distances between the respective packages and the centre of gravity of the aircraft. The values for the rotations are then smoothed to give values for p, q and r.

The total inertial acceleration acting on the centre of gravity of the aircraft may be conceived as being generated in two elements. In one, the components of acceleration formed by changes in velocity vector magnitude and direction changes relative to x, y and z are computed from the values of V, $\dot{V}$, α, $\dot{\alpha}$, β and $\dot{\beta}$ by the following formulae.

ACCELERATIONS DUE TO CHANGE OF VELOCITY VECTOR MAGNITUDE AND DIRECTION RELATIVE TO AXES

Component of acceleration along X axis $\dot{V}_x = l\{\dot{V} - Vl^2(\tan \alpha \operatorname{Sec}^2\alpha.\dot{\alpha} + \tan \beta \operatorname{Sec}^2\beta.\dot{\beta})\}$ Component of acceleration along Y axis $\dot{V}_y = l\{\dot{V} \tan \beta - Vl^2 \operatorname{Sec}^2\alpha(\tan \alpha \tan \beta.\dot{\alpha} - \operatorname{Sec}^2\beta.\dot{\beta})\}$ Component of acceleration along Z axis $\dot{V}_z = l\{\dot{V} \tan \alpha - Vl^2 \operatorname{Sec}^2\beta(\tan \alpha \tan \beta.\dot{\beta} - \operatorname{Sec}^2\alpha.\dot{\alpha})\}$ In the above three equations, l is the velocity vector direction cosine relative to the X-axis. By calculation, it can be shown that:

$l = (1 + \tan^2 \alpha + \tan^2 \beta)^{-\frac{1}{2}}$ l is positive when the velocity vector is in body forward hemisphere and negative when the velocity is in body rear hemisphere.

To the above element of acceleration is added the other element composed of centripetal accelerations induced by rotation about axes, x, y and z.

ACCELERATIONS DUE TO BODY ROTATIONS

X axis

Centripetal acceleration = $Vl(q \tan \alpha - r \tan \beta)$

Y axis

Centripetal acceleration = $Vl(r - p \tan \alpha)$

Z axis

Centripetal acceleration = $Vl(p \tan \beta - q)$

Once the two elements have been computed along each of the axes they may be added to give values of total inertial accelerations along each axis x, y and z, $\ddot{x}_i$, $\ddot{y}_i$, and $\ddot{z}_i$ respectively.

$\ddot{x}_i = l\{\dot{V} + V[q \tan \alpha - r \tan \beta - l^2(\tan \alpha.\operatorname{Sec}^2\alpha.\dot{\alpha} + \tan \beta.\operatorname{Sec}^2\beta.\dot{\beta})]\}$ $\ddot{y}_i = l\{\dot{V} \tan \alpha + V[r - p \tan \alpha - l^2 \operatorname{Sec}^2\alpha(\tan \alpha.\tan \beta.\dot{\alpha} - \operatorname{Sec}^2\beta.\dot{\beta})]\}$ $\ddot{z}_i = l\{\dot{V} \tan \beta + V[p \tan \beta - q - l^2 \operatorname{Sec}^2\beta(\tan \alpha.\tan \beta.\dot{\beta} - \operatorname{Sec}^2\alpha.\dot{\alpha})]\}$ $\dot{x}$, $\dot{V}$, $\dot{\alpha}$ and $\dot{\beta}$ are not available as basic sensor data but have to be derived by differentiating V, α and β, then values for $\ddot{x}_i$, $\ddot{y}_i$ and $\ddot{z}_i$ may be obtained from the more fundamental formulae $\ddot{x}_i = Vl(q\tan\alpha - r\tan\beta) + \frac{d(Vl)}{dt}$ $\ddot{y}_i = Vl(r - p\tan\alpha) + \frac{d(Vl \cdot \tan\beta)}{dt}$ $\ddot{z}_i = Vl(p\tan\beta \cdot q) + \frac{d(Vl\tan\alpha)}{dt}$.

The measured accelerations along axes x, y and z gathered from packages 14, 15 and 16 are smoothed to give values of $\ddot{x}_m$, $\ddot{y}_m$ and $\ddot{z}_m$ respectively.

Then, having computed the total inertial accelerations and the measured accelerations along the x, y and z axes, the pitch and bank angles may be calculated according to the following formulae:

Pitch angle: $\theta = \arcsin[(\ddot{x}_m - \ddot{x}_i)/g]$
Bank angle: $\phi = \arctan[(\ddot{y}_m - \ddot{y}_i)/(\ddot{z}_m - \ddot{z}_i)]$
The Bank angle Quadrature being as follows:

| $\ddot{y}_m - \ddot{y}_i$ | − | − | + | + |
| --- | --- | --- | --- | --- |
| $\ddot{z}_m - \ddot{z}_i$ | − | + | − | + |

NAVIGATIONAL AID

BACKGROUND OF THE INVENTION

This invention relates to apparatus and methods for determining the attitude of a vehicle located in a gravitational field. In particular, but not exclusively, the invention relates to apparatus for determining the orientation of the Earth's gravitational vector with respect to an aircraft operating in the earth's gravitational field and thereby determining the pitch and bank angles of the aircraft.

There are at least two conventional techniques for establishing the attitude of a body in flight to the local horizontal plane. One such technique is Schuler tuning in which values of the spatial velocity of the body and its radius from the centre of the Earth are processed to determine the rate of rotation of the local horizontal plane as the body journeys over the globe. Since the Earth's rotation must be taken into account, the computation of the spatial velocity of the body requires a knowledge of direction of travel and position with respect to the earth's surface. Hence, this technique can only correctly be applied in conjunction with a navigation system.

A second such technique is to detect the Earth's gravitational vector by means of gravity seeking accelerometers. This task is complicated because dynamic acceleration can become confused with gravitational acceleration, and the latter should be isolated from the former. Conventional techniques attempt to separate the two by cutting out the accelerometer's gravity seeking function should the sensed acceleration exceed a certain value. To this end a vertical reference gyroscope, not Schuler tuned, is employed to retain the vertical reference until the extraneous acceleration is removed and the accelerometers can resume their gravity seeking function. This technique is prone to error if the inertial accelerations are within the accelerometer cutout threshold. As the vertical reference gyroscope is not Schuler tuned, and hence does not take account of angular movement about the centre of the Earth, this technique is limited to brief periods of manoeuvre interspersed with periods of steady flight to allow the correct vertical reference to be re-established, if sufficient accuracy is to be maintained. In addition, the vertical reference gyroscope has to be mounted in gimbals which are prone to gimbal lock resulting in toppling of the gyroscope and this imposes an operating limitation.

SUMMARY OF THE INVENTION

In one aspect of this invention, there is provided apparatus for determining the attitude of a body operating in a gravitational field, which apparatus includes means to determine the total acceleration acting on the body, means to determine the inertial component thereof and means to compare the inertial component with the total acceleration so that the orientation of the gravitational component acting on the body can be deduced.

In another aspect of this invention, there is provided a method for determining the attitude of a body operating in a gravitational field, which includes the steps of (i) measuring the total acceleration acting on the body, (ii) calculating the inertial component of the total acceleration acting on the body, and (iii) comparing the total acceleration with the inertial component, thereby to deduce the orientation of the gravitational component acting on the body.

In a further aspect of this invention, there is provided a body operating in a gravitational field, which includes velocity sensor means to sense the velocity magnitude and direction relative to the body axes, rotation sensor means to sense rotation of the body, acceleration sensor means to measure the total acceleration acting on the body, means to process data received from said velocity, heading and rotation sensor means to determine the inertial component of the total acceleration acting on the body, means for comparing the sensed total acceleration with the inertial component, thereby to deduce the orientation of the gravitational component with respect to the body and hence an estimated attitude of the body.

The body may include integrating means for integrating the data received from the rotation sensor means thereby to determine another estimated attitude of the body, and monitoring means for comparing the estimated attitude produced by integration with that produced by deduction of the gravitational component. The estimate produced by integration and that produced by deduction of the gravitational component may each be weighted in terms of their reliability and combined to obtain a best estimate.

Monitoring means may be provided to monitor the second derivative of the data received from one or more of the velocity, rotation, or acceleration sensor means, the monitoring means acting to suppress the estimate produced by deduction of the gravitational component should the second derivative exceed a predetermined value.

As a self-monitoring technique, means may be provided to compare the estimated magnitude of the total gravitational acceleration with the standard value.

The body may include low frequency filter means adapted to smooth short term fluctuations in the data from the speed sensor means, and delay means for delaying data from the heading, rotation and acceleration sensor means, in such a manner as to synchronise the filtered and delayed data from each of the sources. In this case the body may advantageously include integrating means for integrating the data from the rotation sensor means and for adding this to the delayed estimate of the attitude deduced from the gravitational component, thereby to update the delayed estimate of the attitude.

BRIEF DESCRIPTION OF THE DRAWINGS

By way of example only, one specific embodiment of this invention will now be described in detail with reference to the accompanying diagram of a navigational system for an aircraft.

Figure 1:
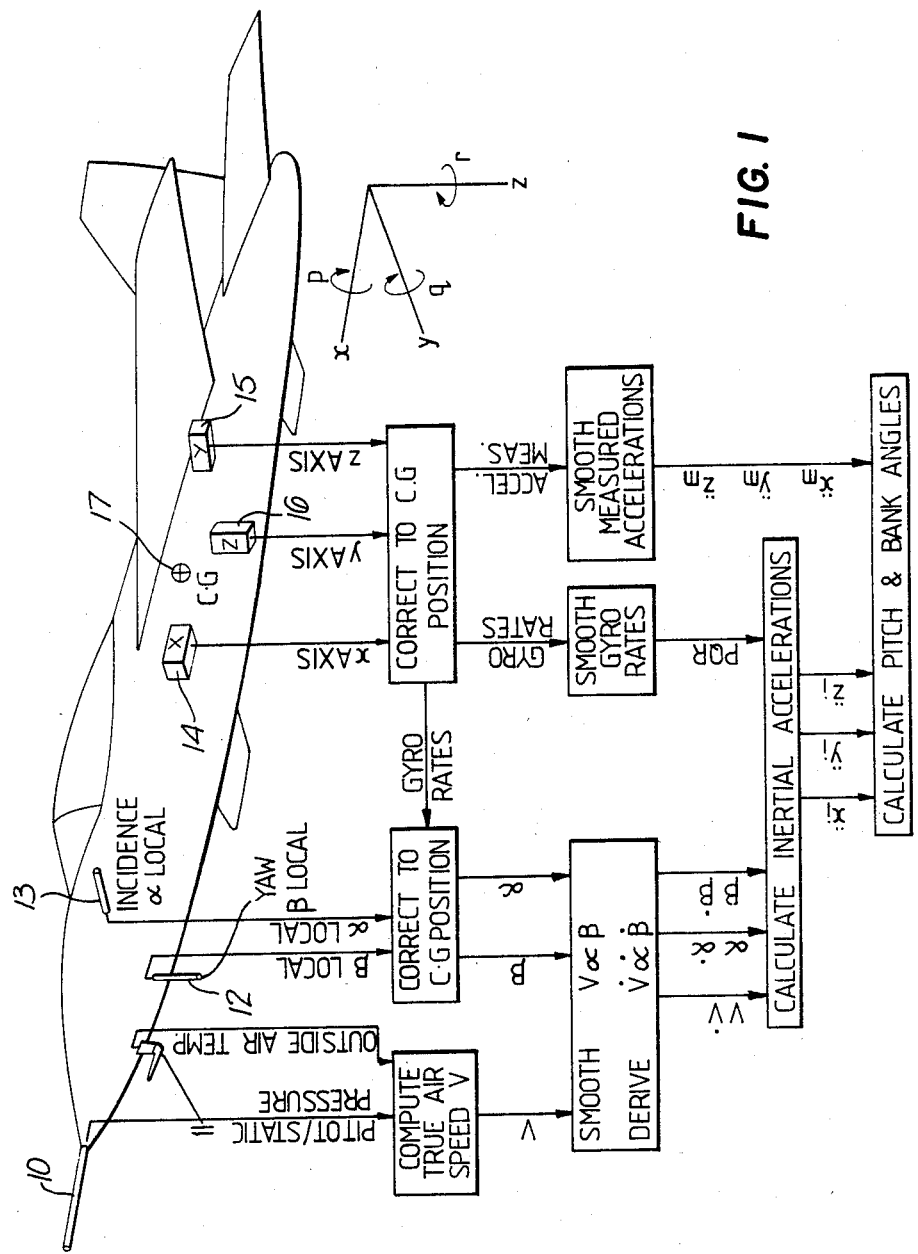
FIG. 1 is a block diagram of an aircraft incorporating a navigational system.

In the drawings and the description the following Notation is used:

V—Speed relative to a non-accelerating reference frame.

$\dot{V}$—Acceleration due to change of speed.

α—Incidence angle referred to centre of gravity of aircraft.

$\dot{\alpha}$—Rate of change of incidence.

| $\phi$ | 0° to 90° | 90° to 100° | 0° to −90° | −90° to −180° |
| --- | --- | --- | --- | --- |

To reduce sensitivity to errors in estimated inertial acceleration at large pitch angles If $[(\ddot{x}_m - \ddot{x}_i)/g > \frac{1}{\sqrt{2}}$, then $$\theta = \arccos \sqrt{(\ddot{y}_m - \ddot{y}_i)^2 + (\ddot{z}_m - \ddot{z}_i)^2} / g$$

Compared with traditional gravity referenced attitude systems (as distinct to schuler tuned inertial navigation systems), the above-described technique offers the following advantages:

1. It does not need periods of tranquil flight to re-establish the vertical reference and is therefore suitable for sustained periods of flight manoeuvre.
2. It is not attitude limited to avoid gimbal lock or gyro toppling.
3. The instantaneous error is dependent upon the instantaneous sensor error and not upon the immediate history of the current manoeuvre. Therefore, immediately following a manoeuvre, any errors induced in the manoeuvre will rapidly diminish.
4. Most of the sensors would also serve other flight reference functions and would be installed in their own right. This should offer a weight and cost saving advantage.

The above technique makes use of the instantaneous output from the body rate gyroscopes used for flight control. Now these gyroscopes alone are capable of providing attitude information by transforming their rate outputs into the attitude axes and integrating. Indeed this method is employed in 'strapdown' inertial navigation but using gyroscopes with an error drift rate of 0.01°/hour compared with a nominal 5°/min called for in flight control.

However, despite the much lower accuracy of the flight control rate gyroscopes, they could be used in this mode over short integration times to extend the above embodiment of the invention to include the following functions:

(1) a degree of self monitoring,
(2) surmounting short-term, short comings in some of the sensors,
(3) reversionary operation with loss of some of the sensors,
(4) a simpler, lower grade technique.

SELF-MONITORING

Even with comparatively high body rate gyroscope drifts of 1°/sec, the error accrued by integrating over a computation repetition cycle time of one-fiftieth of a second or even one-tenth of a second is quite acceptable. The change in attitude derived by integration of gyro rate can therefore be compared with change in attitude from the above technique over short time intervals to serve as a self monitor.

It has been found that estimates of the pitch and bank angle using the above technique give good long-term results, but that in some extreme conditions such as in the case of violent manoeuvres sensor errors (e.g. measuring the true air speed V) may be fairly large thereby decreasing the accuracy of the short-term estimate.

Conversely, in the case of estimates of the pitch and bank angle from integration of the body rate gyro these are generally good in the short term but the accuracy in the long term decreases due to drift of the gyro.

In a modification of the self-monitoring technique, a Kalman filtering technique may be employed to give values of reliability or confidence to estimates from each of these sources and thereby to deduce a best estimate.

CORRECTION FOR SHORT TERM SENSOR ERRORS

As the rate gyroscopes are capable of providing dependable increments in attitude over short periods, they can be used as a substitute for the described embodiment if it is in error for short periods on account of a shortcoming in a sensor. This would depend upon being able to detect conditions where sensor performance might be inferior to establish the last viable attitude base from which the substitute source can extrapolate.

For instance, if Air Data True Air Speed is found to have too large a response lag or is too susceptible to wind gusts etc., it should be possible to detect the disruptive condition by monitoring the second derivative of air speed. Provided the air speed acceleration is not changing above a prescribed rate, the described embodiment would be used. Upon exceeding the prescribed rate, the attitude angle would be incremented from gyro data alone.

In the case where a Kalman filtering technique was employed, and the second derivative of air speed were above the prescribed value, the estimate from the above-described method would be ignored for the duration of the disturbance.

In an alternative technique, short term disruptions in the measured true air speed are smoothed out using a low frequency filter. As mentioned above, this cases a response lag which puts the time air speed data out of phase with the other data from the sensors in the aircraft. This may be overcome by ensuring that the other data is delayed by a similar amount of time. It will be appreciated that this will result in an estimate which is out of date typically by about a third of a second. To remedy this, the estimate may be updated by integrating the data received from the body rate gyro s over the delay period to provide an up-to-date estimate.

REVERSIONARY MODE

In a flight control system, the body rate gyroscopes are perhaps the most fundamental sensors and providing they are functioning, the aircraft might be flown in a 'get home' mode with other sensors inoperative, e.g. air data sensors. Providing the accelerometers are still functioning it should be possible to derive attitude, although at a lower quality, without air data information.

Fundamentally, the above technique separates inertial from gravitational acceleration. If the aircraft is flying steadily there will be no inertial acceleration and the above embodiment will deduce correct attitude from the accelerometer measurements alone. The condition for zero inertial acceleration can be identified by monitoring for both no change in measured acceleration and zero rotation rate from the gyroscopes. In practice, the aircraft is never in a zero inertial acceleration state because of air turbulence etc. and supplementary smoothing may be required to assist in detecting the zero inertial acceleration conditions.

The reversionary mode would operate as a series of attitude fixes, derived from the zero inertial acceleration condition, with attitude interpolated by integration of the gyro body rates.

Simpler Attitude Technique

Clearly the method outlined for reversion can be used in its own right as an attitude system. In one sense it can be regarded as trading air data sensors for more precise gyroscopes. Fundamentally, it depends how frequently a zero inertial acceleration attitude fix can be obtained.

One important factor is that even with perfect gyroscopes, errors would be introduced due to the curvature of the Earth. The gyroscopes of course give a spatial attitude reference, whereas, in flight at Mach 0.9 due East, the horizontal plane would rotate at 25°/hour at UK latitudes. Thus 6 minutes after a fix, perfect gyroscopes would accrue an error of 2.5°. Obviously, frequent fixes would prevent excessive errors from this source.

Figure 2:
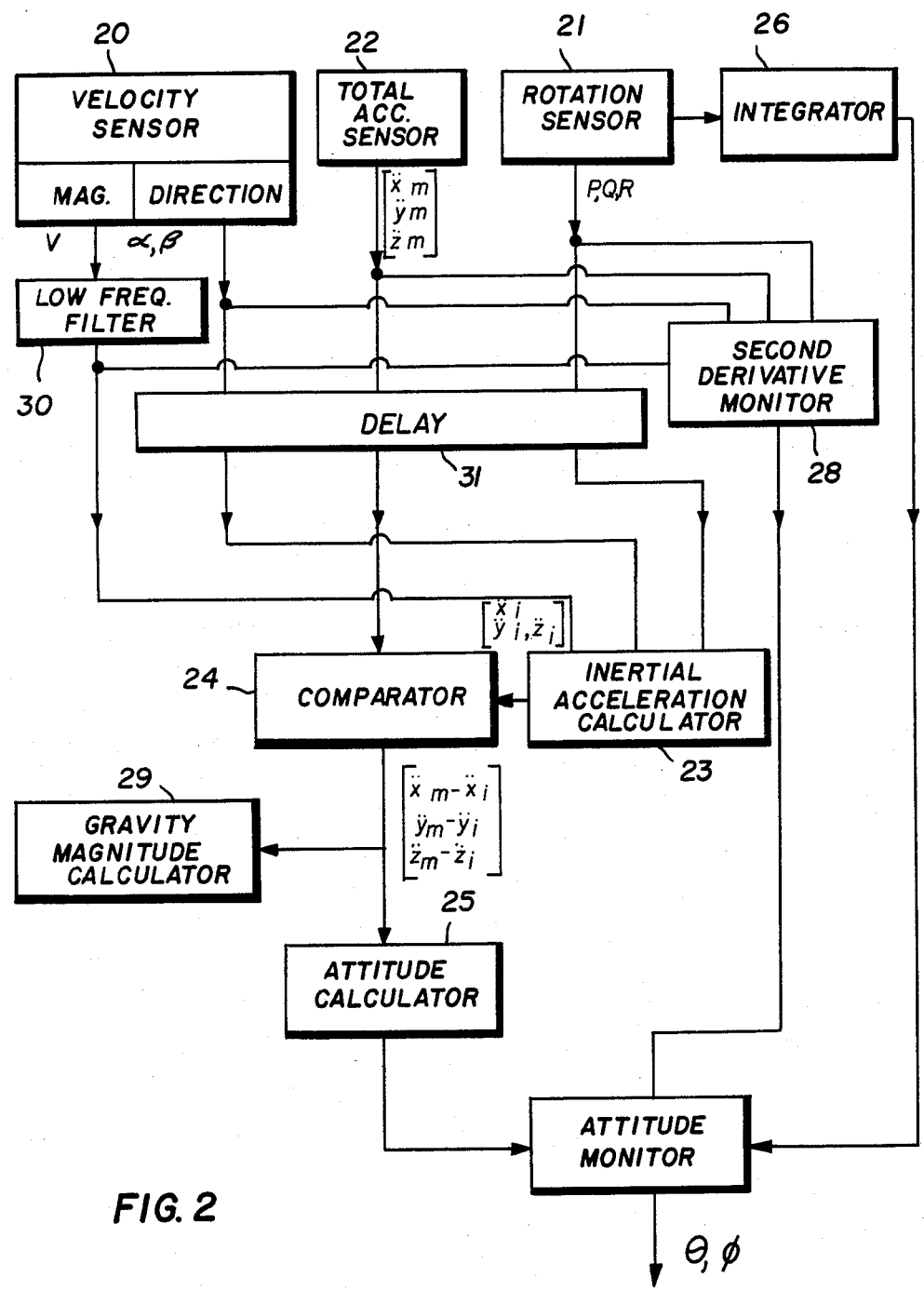
FIG. 2 is a block diagram illustrating certain preferred features of the navigational system incorporated in the aircraft of FIG. 1.

The following is a detailed description of FIG. 2, Velocity sensor 20 senses velocity magnitude V, and direction ($\alpha$, $\beta$) relative to the body axes. Rotation sensor 21 senses rotations p,q,r, of the body about the body axes and total acceleration sensor 22 measures total acceleration ($\ddot{x}_m$, $\ddot{y}_m$, $\ddot{z}_m$,) of the body along the body axes. Data from the velocity sensor 20 and the rotation sensor 21 are processed by inertial acceleration calculator 23 to determine the inertial component of the total acceleration ($\ddot{x}_i$, $\ddot{y}_i$, $\ddot{z}_i$). A comparator 24 compares the measured total acceleration with the inertial component thus to deduce the orientation of the gravitational component of acceleration with respect to the body from which the attitude of the body is calculated by attitude calculator 25.

Integrator 26 integrates data received from the rotation sensor thereby to determine another estimated attitude of the body. An attitude monitor 27 compares the estimated attitude produced by integration with that produced by deduction of the gravitational component. The estimate produced by integration and that produced by deduction of the gravitational component may each be weighted in terms of their reliability and combined to obtain a best estimate, e.g. by means of a Kalman filtering technique.

A second derivative monitor 28 monitors the second derivatives of the velocity, rotation and acceleration sensors 20, 21, 22, and suppresses the estimate produced by deduction of the gravitational component should the second derivative exceed a predetermined value.

A gravity magnitude monitor 29 calculates the magnitude of the total gravitational acceleration with the standard valve thus to serve as a self monitoring technique.

A low frequency filter 30 may be provided to smooth short term fluctuations in the velocity magnitude data from the velocity sensor 20 and a delay element 30 delays data from the rotation and acceleration sensors 21, 22 together with the velocity direction data, so that the data supplied to the inertial acceleration calculator 23 is synchronized. In this case, the delayed estimate of the attitude may be updated by integrating at 26 the data from the rotation sensor 21 and adding it to this delayed estimate.

As a further self-monitoring system, the values obtained for the gravitational acceleration along the x, y and z axes. ($\ddot{x}_m - \ddot{x}_i$), ($\ddot{y}_m - \ddot{y}_i$) and ($\ddot{z}_m - \ddot{z}_i$) may be added vectorially and compared to the known value of g to serve as a self monitor.

As a yet further modification, estimates of the pitch and bank angles may be combined with the outputs from a 3-axes magnetometer thereby to deduce the heading of the aircraft.

I claim:

1. Apparatus for determining the attitude of a body operating in a gravitational field comprising:
   acceleration sensor means for measuring the total acceleration of the body in relation to a coordinate system fixed with respect to said body;
   inertial acceleration calculating means for calculating the total inertial component of the total acceleration in relation to said coordinate system;
   comparator means for comparing said measured total acceleration with said total inertial component thereby to generate data representative of the orientation of the gravitational component of acceleration in relation to said coordinate system; and
   attitude calculating means for receiving said data and for calculating the attitude of the body.

2. A method of determining the attitude of a body operating in a gravitational field comprising:
   measuring the total acceleration acting on the body in relation to a coordinate system fixed with respect to said body;
   calculating the total inertial component of the total acceleration in relation to said coordinate system;
   comparing said measured total acceleration with said total inertial component, thereby to generate data representative of the orientation of the gravitational component of acceleration in relation to said coordinate system; and
   processing said data to determine the attitude of said body.

3. An arrangement for determining the attitude of a body operating in a gravitational field comprising:
   means for defining, with respect to said body, a coordinate system having three orthogonal axes;
   velocity sensor means for sensing body velocity magnitude and direction relative to said axes;
   rotation sensor means for sensing rotation of the body about each of said axes;
   acceleration sensor means for measuring the total acceleration of the body along each of said axes;
   inertial acceleration calculating means for receiving data from said velocity sensor means and said rotation sensor means and processing it to determine the total inertial component of acceleration of the body;
   comparator means for comparing said measured total acceleration with said total inertia component thereby to generate data representative of the orientation of the gravitational component of acceleration in relation to said coordinate system; and
   attitude calculating means for receiving said data and for calculating the attitude of the body.

4. An arrangement according to claim 3 wherein the orthogonal set of axes are x, y, z axes, wherein said inertial acceleration calculating means determine a portion ($x_i$, $y_i$, $z_i$ respectively) of the inertial component of acceleration acting along the x, y, and z axes according to the following expressions:

$$\ddot{x}_i = l(\dot{V} + V[q \tan \alpha - r \tan \beta - l^2(\tan \alpha.\sec^2\alpha.\dot{\alpha} + \tan \beta.\sec^2\beta.\dot{\beta})])$$

$$\ddot{y}_i = l(\dot{V}\tan\alpha + V[r-p\tan\alpha - l^2\sec^2\dot\alpha(\tan\alpha.\tan\beta.\alpha - \sec^2\beta.\dot\beta)])$$

$$\ddot{z}_i = l(\dot{V}\tan\beta + V[p-p\tan\beta - q - l^2\sec^2\beta(\tan\alpha.\tan\beta.\dot\beta - \sec^2\alpha.\dot\alpha)])$$

wherein

V is the speed of the vehicle relative to a non-accelerating frame of reference and $\dot{V}$ is the derivative of V with respect to time;

$\alpha$ is the angle of incidence referred to the center of gravity of the vehicle and $\dot\alpha$ is the derivative of $\alpha$ with the respect to time;

$\beta$ is the yaw angle referred to the center of gravity of the aircraft and $\dot\beta$ is the derivative of $\dot\beta$ with respect to time;

p, q, and r are the rotations of the vehicle about axes x, y and z respectively, and l is the velocity vector cosine relative to the x axis, and wherein the acceleration sensor means measure the portion ($\ddot{x}_m$, $\ddot{y}_m$, $\ddot{z}_m$ respectively) of the total acceleration acting along the x, y and z axes, said arrangement further including means for deducing the pitch and bank angles of the vehicle ($\theta$, $\phi$) according to the following expressions:

$$\theta = \arcsin\ [x_m - x_i)/g]$$

$$\phi = \arctan\ [m - y_i)/(z_m - z_i)].$$

5. An arrangement according to claim 3, further including:

integration means for integrating the data received from the rotation sensor means to determine an estimated attitude of the vehicle, and monitoring means for comparing the estimated attitude produced by integration with that produced by deduction of the gravitational component.

6. An arrangement according to claim 5, wherein the estimate produced by integration and that produced by deduction of the gravitational component are each weighted in terms of their reliability and combined to obtain a best estimate employing a Kalman filtering technique.

7. An arrangement according to claim 5, further comprising: monitoring means for monitoring the second derivative of the data received from one or more of the velocity, rotation and acceleration sensor means, the monitoring means including means for suppressing the estimate produced by deduction of the gravitational component should the second derivative exceed a predetermined value.

8. An arrangement according to claim 3, further including means for calculating the magnitude of the gravitational component and means for comparing the calculated magnitude with standard gravity thereby to serve as a monitor.

9. An arrangement according to claim 3, further including low frequency filter means for smoothing short term fluctuations in the body velocity magnitude data from the velocity sensor means, and delay means for delaying body velocity direction data from said velocity sensor means and data from each of the rotation and acceleration sensor means in such a manner as to synchronize said delayed data with said filtered data, whereby the arrangement produces a delayed estimate of the attitude of the vehicle.

10. An arrangement according to claim 9, further including integrating means for integrating the data from the rotation sensor means and for adding the integrated data to the delayed estimate of the attitude deduced from the gravitational component, thereby to update the delayed estimate of the attitude.

11. Apparatus for determining the attitude of the body operating in a gravitational field comprising:

acceleration sensor means for measuring the total acceleration of the body in relation to a coordinated system fixed with respect to said body and for outputting data ($\ddot{x}_m$, $\ddot{y}_m$, $\ddot{z}_m$) representative of said measured total acceleration;

inertial acceleration calculating means for calculating the total inertial component of the total acceleration in relation to said coordinate system and for outputting data ($\ddot{x}_i$, $\ddot{y}_i$, $\ddot{z}_i$) representative of said total inertial component; and attitude calculating means for receiving data output by said inertial acceleration calculating means and for processing it to determine the pitch and bank angles of the body ($\theta$, $\phi$) according to the following expressions:

$$\theta = \arcsin\ [\ddot{x}_m - \ddot{x}_i)/g]$$

$$\phi = \arctan\ [\ddot{y}_m - \ddot{y}_i)/(\ddot{z}_m - \ddot{z}_i)].$$

* * * * *